United States Patent [19]
Jensen

[11] 3,735,466
[45] May 29, 1973

[54] APPARATUS FOR FASTENING CONTACT PINS TO A SUBSTRATE

[75] Inventor: Neil F. Jensen, Phoeniz, Ariz.

[73] Assignee: Semiconductors Electronic Memories Incorporated, Phoenix, Ariz.

[22] Filed: May 3, 1971

[21] Appl. No.: 139,411

[52] U.S. Cl. ....................29/203 B
[51] Int. Cl. ....................H05k 13/04
[58] Field of Search ....................29/203 B, 630 A, 29/630 D, 203 D, 203 DT, 200 B, 203 R

[56] References Cited

UNITED STATES PATENTS 3,257,708 6/1966 Stricker....................29/203 B X

*Primary Examiner*—Thomas H. Eager
*Attorney*—Lindenberg, Freilich & Wasserman

[57] ABSTRACT

A die structure for fastening contact pins to a thin brittle ceramic substrate is disclosed. The structure includes a plurality of individual bushings, which are supported on a flexible pad, and which in turn support the substrate. The flexible pad represents an elastic foundation of particular spring constant. When a heading ram is lowered on contact pins to form pin heads, the substrate is in direct contact with the flexible bushings, since the bushings move in a plane parallel to the force and conform to the substrate irregularities, thereby eliminating any bending moments in the substrate which cause substrate cracking.

6 Claims, 2 Drawing Figures

PATENTED MAY 29 1973 3,735,466

INVENTOR.
NEIL F. JENSEN
BY
Lindenberg, Freilich & Wasserman
ATTORNEYS

APPARATUS FOR FASTENING CONTACT PINS TO A SUBSTRATE

BACKGROUND OF THE INVENTION

1. Field of the Invention

The present invention generally relates to electronic circuitry and, more particularly, to a device for fastening contact pins to a base, such as a ceramic substrate, with cambers or surface irregularities.

2. Description of the Prior Art

In the miniaturization of electrical components and the formation of small electronic packages, ceramic bases or substrates are extensively used to support contact pins which are fastened to the substrates. Various techniques and devices have been proposed to attach or fasten the pins to the ceramic substrate, which is relatively thin and brittle. Typically, the substrate has cambers, nonplanar surfaces or surface irregularities which are more pronounced in substrates with large surfaces. None of the known prior art devices operates satisfactorily when fastening pins to a ceramic substrate with surface irregularities. Typically, the presence of those irregularities cause a large number of the substrates to crack during the pin fastening operation.

Typical of the more advance prior art systems is the one described by A. A. Stricker in U. S. Pat. No. 3,257,708. Therein, Stricker's apparatus includes a stationary die with a rubber cushion on which the ceramic substrate is placed. The function of the cushion is merely to keep the substrate off the die's hard inflexible top surface. Pins extend through holes in the substrate into the stationary die. The pins are then mechanically deformed by the application of a force onto the ends of the pins which extend above the substrate.

The major disadvantage of the Stricker device is its inability to eliminate or greatly reduce the bending moments produced in the substrate when the deforming force is applied to the pins. This is due to the fact that in the prior art patent, the rubber on which the substrate is supported, once it is deformed when the substrate is pressed against it, acts as part of the stationary die and therefore cannot eliminate the banding moments in the substrate. Also, in the prior art patent, the portions of the substrate around the holes through which the pins are inserted are actually not supported on the rubber cushion. Consequently, when the force is applied to the pins and, as a result, bending moments are produced, nothing is provided to support the substrate at those points to eliminate the bending moments.

As a result, the use of Stricker's device results in a significant number of cracked and therefore unusable substrates. This is particularly the case with the larger substrates which typically exhibit more and larger cambers or surface irregularities. Thus, a need exists for a new device capable of fastening pins to a ceramic substrate with large cambers without cracking the thin and brittle substrate.

OBJECTS AND SUMMARY OF THE INVENTION

It is a primary object of the present invention to provide a new improved apparatus for fastening pins to a relatively thin brittle substrate.

Another object of the present invention is to provide a new apparatus for fastening pins to a relatively thin brittle substrate with surface irregularities in a way which reduces the likelihood of substrate cracking.

These and other objects of the invention are achieved by directly supporting the nonplanar substrate on a cluster of bushings which are in turn mounted on an elastic support. The pins are inserted through the substrate into the bushings and are stopped by backup pins. As a force is applied to the tops of the pins by a heading ram, or the like, to form pin heads, components of force on the pins are taken up by the substrate. However, since in the present invention the bushings, rather than being stationary, as in the prior art, are supported on a resilient or elastic base they conform to the nonplanar surface of the substrate to relieve any bending moments therein. Thus, the likelihood that the substrate would crack during the fastening operation is greatly reduced.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
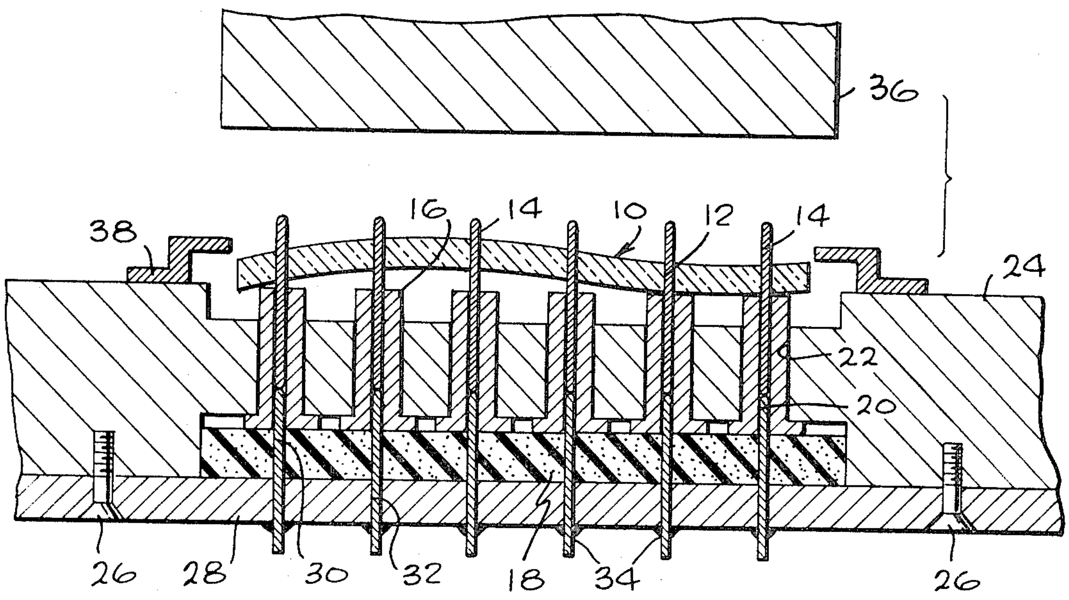
FIGS. 1 and 2 are cross-sectional views of a preferred embodiment of the invention.

Attention is now directed to FIG. 1 wherein reference numeral 10 designates a ceramic substrate with a plurality of holes 12 into which pins 14 are inserted for subsequent fastening to the substrate as will be described hereafter. The substrate 10 is directly supported on a plurality of bushings 16 which are supported on an elastic resilient pad 18. Each bushing defines a longitudinal or axial cavity or hole 20.

The bushings 16 are supported along most of their lengths in openings 22 of a die block 24, which is connected, such as by means of screws 26, to a back plate 28 on which pad 18 rests. Pad 18 and plate 28 define respective openings 30 and 32 which are aligned with openings 20 of the bushings, to facilitate the insertion of backup pins 34 into the bushings through pad 18 and plate 28. The pins 34, once inserted remain in a fixed position with respect to plate 28. On the other hand, the bushings supported in openings 22 of block 24 are free to move axially within these openings toward plate 28 by elastic deformation of the pad 18 when a force is applied to the tops of the bushings.

In operation the substrate 10 is placed on the bushings 16 with holes 12 in the substrate aligned with bushing openings 20. The pins 14 are inserted into the bushings through the substrate holes. The bottom ends of pins 14 are in direct contact with the top ends of backup pins 34. The top ends of pins 14 extend above substrate and are at the same height.

Figure 2:
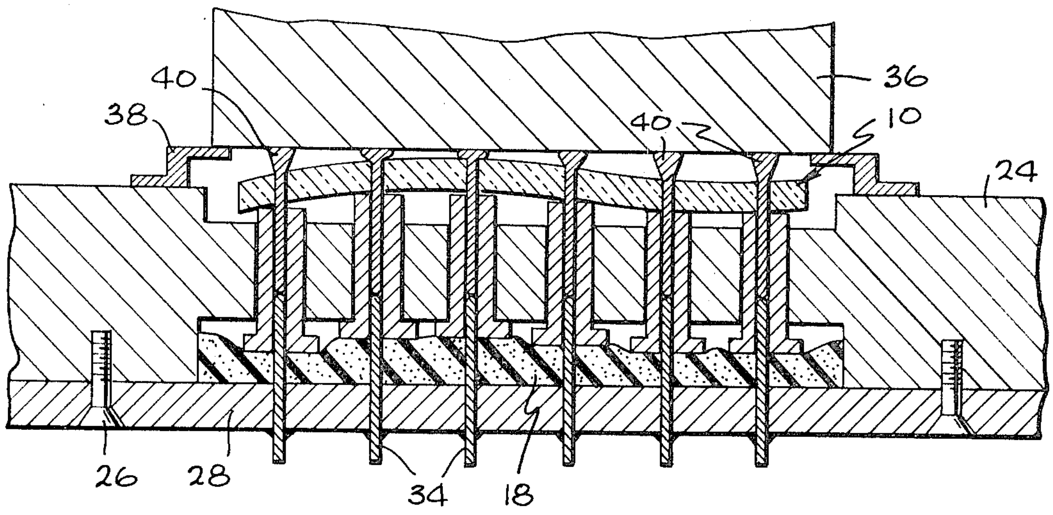

After the pins 14 are inserted a heading ram 36 either at constant force or limited by a mechanical stop, such as stops 38, applies a force to the tops of pins 12. The force deforms them to form heads 40 as shown in FIG. 2. As the ram applied force on the pins, the heads are formed by the part of the force on which is supported by the substrate.

As seen from FIG. 2, when the heading ram 36 is lowered, the bushings are selectively deflected, to assume the contour of the bottom side of the substrate which they contact. As a result, there is very little if any substrate deflection and the resulting moments and therefore tensile stresses on the substrate are kept within safe limits thereby avoiding substrate cracking. Alternately stated, in the present invention the tops of the bushings are in direct contact with the bottom side of the substrate portions around the holes. Consequently, bending moments and therefore tensile stresses in the thin substrate are eliminated or at least greatly reduced thereby preventing cracking. The pad is selected to give the desired deflection characteristics and still provide sufficient support for the bushings to enable the formation of pin heads 40.

In one particular embodiment a urethane pad .040 inch thick was employed as pad 18. The invention was used with excellent results to form heads on copper pins with about 0.2 percent zirconium. The pins were 0.20 inch thick and 0.290 inch long. The substrate was 0.630×0.630×0.060 inches with holes of 0.22±0.001 inch and had surfaces irregularities of about 0.005 inch. These specific details are presented as one example of actual usage of the invention. It should however be appreciated that the invention is not intended to be limited thereto.

Although a particular embodiment of the invention has been described and illustrated herein, it is recognized that modifications and variations may readily occur to those skilled in the art and consequently it is intended that the claims be interpreted to cover such modifications and equivalents.

What is claimed is:

1. An apparatus for fastening a plurality of contact pins to a substrate in spaced apertures defined therein in a preselected array, the apparatus comprising:

a plurality of bushings, each bushing having a first end, for supporting said substrate on said first ends, said bushings being arranged in an array corresponding to the array of apertures in said substrate, each bushing defining an axial aperture which is aligned with a different aperture in said substrate;

a stationary bushing support structure including elastic means with which ends of said bushings opposite said first ends are in contact for supporting said bushings in their array arrangement, with each bushing being deflectable along its axis toward said elastic means;

a plurality of backup pins fixedly positioned with respect to said support structure each backup pin having a top end thereof in the axial aperture of a different bushing;

each contact pin being insertable through a different substrate aperture into the bushing aperture which is aligned with a different substrate aperture, whereby one end of the contact pin rests on the top of the backup pin in the bushing aperture and the other end of the contact pin extends above said substrate; and ram means for applying a force to the ends of the contact pins which extend above said substrate to form pin heads from the ends of the contact pins which extend above said substrate, with said individual bushings being deflectable toward said elastic means so that the ends of the bushings on which said substrate rests conform to the substrate's surface configuration.

2. An apparatus as recited in Claim 1 wherein the first ends of said individual bushings extend above said stationary support structure, whereby said substrate is at all times supported by said bushings and is spaced apart from said support structure.

3. An apparatus as recited in Claim 1 wherein said support structure includes a base plate for supporting said elastic means on which said bushings rest, said base plate and said elastic means defining a plurality of apertures for facilitating the insertion of the top end of each backup pin into a bushing aperture through a different pair of apertures in said base plate and said elastic means, said support structure further including a bushing block fixedly coupled to said base-plate and defining a plurality of apertures, each accommodating a different bushing therein which is axially movable therein.

4. An adjustable contour die for forming heads on pins insertable in an array of apertures defined in a thin brittle substrate with surface irregularities, comprising:

a support structure including elastic means;

a plurality of individual bushings, each having a first end supported by said support structure on said elastic means at said first ends, each bushing defining an axial aperture which extends from said first end to a second end, opposite said first end, with said bushings being arranged in an array corresponding to said array of apertures of said substrate whereby said pins are insertable into the apertures of said bushings through the apertures of said substrate which is supported on the second ends of said bushings;

stop means comprising a plurality of elements fixedly connected to said support structure, extending into the axial apertures of said bushings, whereby the pins inserted into the bushings through the substrate have first ends in contact with said elements and opposite ends extending above said substrate; and means for applying a force to said second ends of said pins.

5. An apparatus as recited in claim 4 wherein the first ends of said individual bushings extend above said stationary support structure, whereby said substrate is at all times supported by said bushings and is spaced apart from said support structure.

6. An apparatus as recited in claim 5 wherein each element is a backup pin and wherein said support structure includes a base plate for supporting said elastic means on which said bushings rest, said base plate and said elastic means defining a plurality of apertures for facilitating the insertion of the top end of each backup pin into a bushing aperture through a different pair of apertures in said base plate and said elastic means, said support structure further including a bushing block fixedly coupled to said baseplate and defining a plurality of apertures, each accommodating a different bushing therein which is axially movable therein.

* * * * *